United States Patent
Butts et al.

(10) Patent No.: US 9,830,931 B2
(45) Date of Patent: Nov. 28, 2017

(54) CROWDSOURCED DATABASE FOR SOUND IDENTIFICATION

(71) Applicant: Harman International Industries, Inc., Stamford, CT (US)

(72) Inventors: Donald Joseph Butts, Westport, CT (US); Brandon Stacey, Monroe, CT (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 36 days.

(21) Appl. No.: 14/986,523

(22) Filed: Dec. 31, 2015

(65) Prior Publication Data
US 2017/0194021 A1    Jul. 6, 2017

(51) Int. Cl.
| | |
|---|---|
| G10L 25/00 | (2013.01) |
| G10L 25/51 | (2013.01) |
| G06F 17/30 | (2006.01) |
| G10L 25/72 | (2013.01) |
| H04B 15/00 | (2006.01) |
| H04R 5/033 | (2006.01) |

(52) U.S. Cl.
CPC ........ *G10L 25/51* (2013.01); *G06F 17/30778* (2013.01); *G10L 25/72* (2013.01); *H04B 15/00* (2013.01); *H04R 5/033* (2013.01)

(58) Field of Classification Search
CPC . H04R 1/222; H04R 1/24; H04R 5/00; H04R 5/02; H04R 5/04
USPC ........... 704/270, 245, 273; 707/770; 381/58; 700/253; 901/47
See application file for complete search history.

(56) References Cited

U.S. PATENT DOCUMENTS

| | | | |
|---|---|---|---|
| 8,965,005 B1 | 2/2015 | Gopalakrishnan et al. | |
| 9,183,845 B1 | 11/2015 | Gopalakrishnan et al. | |
| 9,411,882 B2 * | 8/2016 | Cory | H04S 7/30 |
| 2001/0044719 A1 * | 11/2001 | Casey | G10L 15/02 |
| | | | 704/245 |
| 2006/0149552 A1 * | 7/2006 | Bogdanov | G10L 25/48 |
| | | | 704/273 |

(Continued)

FOREIGN PATENT DOCUMENTS

EP    2892247 A1    7/2015

OTHER PUBLICATIONS

International Search Report and Written Opinion for PCT/IB2016/057516 dated Mar. 15, 2017.

*Primary Examiner* — Charlotte M Baker
(74) *Attorney, Agent, or Firm* — Artegis Law Group, LLP

(57) ABSTRACT

One embodiment of the present invention sets forth a technique for determining a set of sound parameters associated with a sound type. The technique includes receiving, via a network and from each a first plurality of remote computing devices, an audio recording of a first sound type and a descriptor associated with the first sound type. The technique further includes processing the audio recordings via a processor to determine a first set of sound parameters associated with the first sound type. The technique further includes receiving a request associated with the descriptor from at least one remote computing device and, in response, transmitting the first set of sound parameters associated with the first sound type to the at least one remote computing device.

20 Claims, 5 Drawing Sheets

(56) References Cited

U.S. PATENT DOCUMENTS

| | | | |
|---|---|---|---|
| 2015/0242509 A1* | 8/2015 | Pall | G06F 9/44521 707/770 |
| 2015/0273693 A1* | 10/2015 | Cohen | B25J 9/1661 700/253 |
| 2016/0007130 A1* | 1/2016 | Germain | H04R 3/00 381/58 |
| 2016/0249132 A1* | 8/2016 | Oliaei | H04R 1/406 |

* cited by examiner

DATABASE 314

315-1

SOUND TYPE: HOUSEHOLD APPLIANCE BRAND/MODEL

1. RECORDING 1 [DEVICE 200-1] [DESCRIPTOR A]
2. RECORDING 2 [DEVICE 200-2] [DESCRIPTOR A]
3. RECORDING 3 [DEVICE 200-3] [DESCRIPTOR A]
4. RECORDING 4 [DEVICE 200-4] [DESCRIPTOR A]
   •
   •
   •
N. RECORDING N [DEVICE 201-N] [DESCRIPTOR A]

315-2

SOUND TYPE: VEHICLE MAKE/MODEL

1. RECORDING 1 [DEVICE 200-100] [DESCRIPTOR B]
2. RECORDING 2 [DEVICE 200-102] [DESCRIPTOR B]
3. RECORDING 3 [DEVICE 200-103] [DESCRIPTOR B]
4. RECORDING 4 [DEVICE 200-104] [DESCRIPTOR B]
   •
   •
   •
N. RECORDING N [DEVICE 200-M] [DESCRIPTOR B]

FIG. 3B

CROWDSOURCED DATABASE FOR SOUND IDENTIFICATION

BACKGROUND

Field of the Embodiments of the Invention

The various embodiments relate generally to audio signal processing and, more specifically, to a crowdsourced database for sound identification.

Description of the Related Art

Recent technological advancements in the consumer electronics industry have increased the portability and affordability of various types of media players, such as computers, mobile phones, and MP3 players. As a result, more and more consumers are integrating these types of devices into their daily lives. For example, an individual may use a computer to listen to music at work or use a mobile phone to listen to music or watch a video program during the commute to and from work.

In order to avoid disturbing others, many users listen to media players using a listening device, such as a pair of headphones. However, using headphones may reduce a user's ability to hear sounds in the ambient environment or communicate with those around the user. Moreover, many headphones provide noise-isolation and/or noise-cancellation functions designed to reduce the degree to which a user can hear ambient sounds. As such, a user may not be able to hear important sounds in the ambient environment, such as vehicle noise, sirens, or the voice of someone who is trying to get the attention of the user.

As a result of these issues, various techniques have been developed for detecting sounds in the ambient environment and, in response to detecting a sound, performing a specific action via a pair of headphones or a computing device. For example, some techniques enable sounds within the ambient environment to be selectively blocked by the headphones (e.g., via noise cancellation) or passed to the user, depending on preferences selected by the user. Additionally, some techniques enable audio playback to be paused upon detecting a particular sound in the ambient environment.

Although systems that implement such techniques are able to detect generic sounds within the ambient environment with an acceptable degree of accuracy, these systems typically are less effective at detecting specific types of sounds. For example, although a conventional system may be preprogrammed to recognize generic traffic noise, the system may not accurately identify the sound characteristics of a specific vehicle encountered by a user. Further, such systems cannot reasonably be preprogrammed to detect all of the potential sound types a user may encounter. For example, a user who is working on a construction site may wish to block the noise produced by a specific type and brand of power tool. However, conventional systems cannot reasonably be preprogrammed to identify all possible types of power tools that could be encountered by a user.

As the foregoing illustrates, more effective techniques for enabling a user to interact with his or her surroundings while operating a listening device, such as a pair of headphones, would be useful.

SUMMARY

Embodiments of the present disclosure set forth a method for determining a set of sound parameters associated with a sound type. The method includes receiving, via a network and from each a first plurality of remote computing devices, an audio recording of a first sound type and a descriptor associated with the first sound type. The method further includes processing the audio recordings via a processor to determine a first set of sound parameters associated with the first sound type. The method further includes receiving a request associated with the descriptor from at least one remote computing device and, in response, transmitting the first set of sound parameters associated with the first sound type to the at least one remote computing device.

Further embodiments provide, among other things, a system and a non-transitory computer-readable medium configured to implement the method set forth above.

Advantageously, the disclosed techniques enable audio recordings of a specific sound type to be crowdsourced to generate large datasets, enabling a set of sound parameters to be more accurately determined to identify the specific sound type. Accordingly, the user of a computing device is able to retrieve sets of sound parameters to identify specific types of sounds that are not preprogrammed into the computing device and which otherwise could not be generated without incurring significant hardware and processing costs.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

FIG. 3B illustrates groups of audio recordings stored within the database of FIG. 3A.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

System Overview

Figure 1:
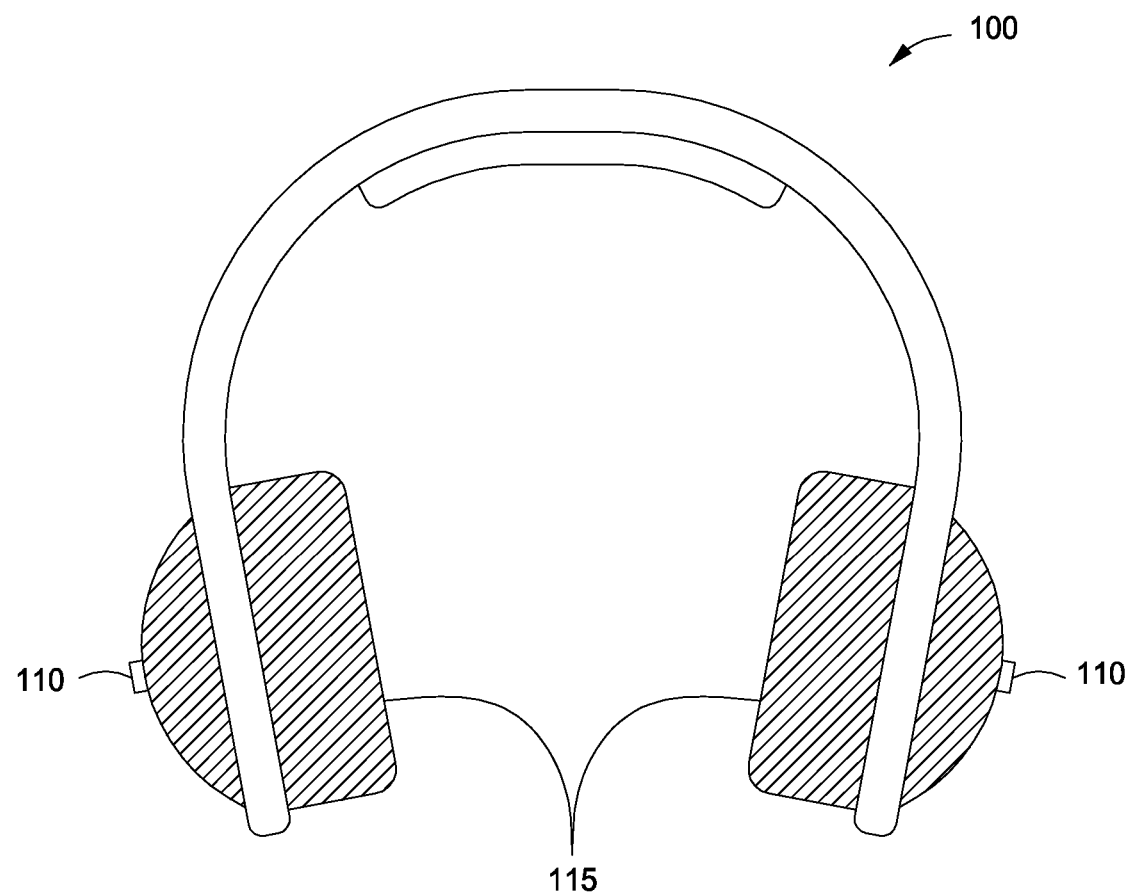
FIG. 1 illustrates a listening device for identifying a sound type based on a set of sound parameters, according to various embodiments.

FIG. 1 illustrates a listening device 100 for identifying a sound type based on a set of sound parameters, according to various embodiments. The listening device 100 may include, without limitation, one or more microphones 110 and one or more speakers 115.

The microphone(s) 110 are configured to acquire sound from the surrounding environment and transmit signals associated with the sound to a computing device for processing. As such, the microphone 110 may be located in a portion of the listening device 100 that faces outward, away from the user. Alternatively, the microphone 110 may be physically separate from the listening device 100 and coupled to the listening device 100 via a wired connection or wireless connection.

The speaker(s) 115 are configured to produce sounds based on signals that are generated by a computing device and/or other signals that are transmitted to the speaker 115. For example, and without limitation, the speakers 115 could be configured to produce ambient sounds that are acquired by the microphone 110, processed by the computing device, and transmitted to the speakers 115. In some embodiments, the speakers 115 may be configured for high-fidelity sound reproduction. In other embodiments, in order to reduce the size and/or cost of the speakers 115, the speakers 115 may be configured for less accurate sound reproduction. For example, and without limitation, the speakers 115 could be configured to produce only a subset of frequencies within the normal human hearing range.

In various embodiments, the listening device 100 may include a pair of headphones, such as the over-the-ear headphones shown in FIG. 1. However, any type of wired or wireless headphones, including circumaural headphones, supra-aural headphones, and in-ear headphones, may be used to perform the techniques described herein. Further, the listening device 100 may include noise-isolation characteristics and/or a noise-cancellation function. In other embodiments, the listening device 100 may be any acoustic device that is able to amplify and reproduce sound for a user, including an assistive medical device, such as a hearing aid, or a mobile communication device, such as a Bluetooth® headset.

Figure 2:
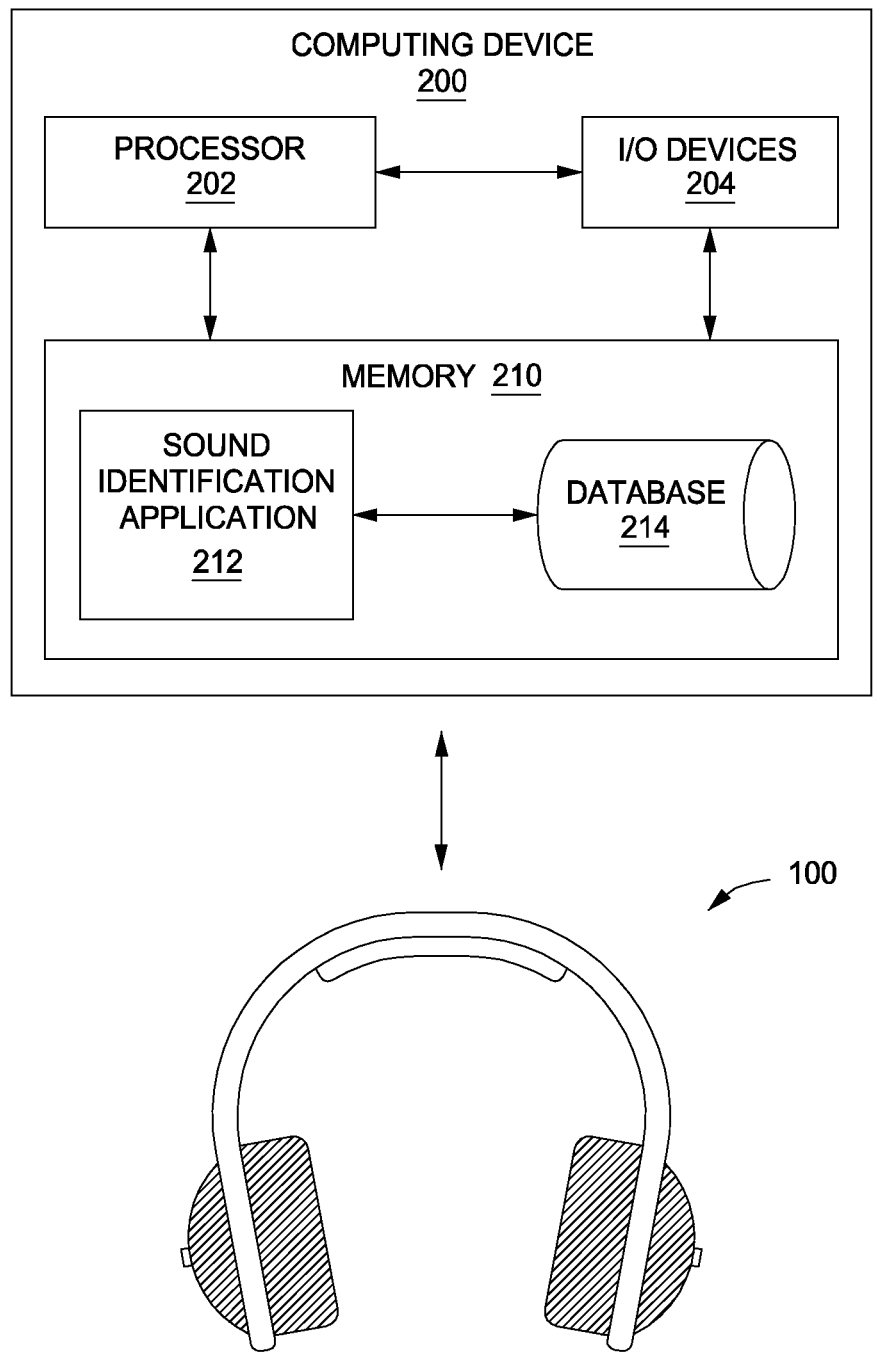
FIG. 2 illustrates a computing device that may be implemented in conjunction with the listening device of FIG. 1, according to various embodiments.

FIG. 2 illustrates a computing device 200 that may be implemented in conjunction with the listening device 100 of FIG. 1, according to various embodiments. As shown, the computing device 200 includes a processor 202, input/output (I/O) devices 204, and a memory 210. The memory 210 includes a sound identification application 212 configured to interact with a database 214.

The processor 202 may be any technically feasible form of processing device configured to process data and execute program code. The processor 202 could be, for example, and without limitation, a central processing unit (CPU), a graphics processing unit (GPU), an application-specific integrated circuit (ASIC), a field-programmable gate array (FPGA), and so forth.

Memory 210 may include a memory module or a collection of memory modules. The sound identification application 212 within memory 210 is executed by the processor 202 to implement the overall functionality of the computing device 200 and, thus, to coordinate the operation of the listening device 100 as a whole. For example, and without limitation, audio samples acquired via the microphone(s) 110 may be processed by the sound identification application 212 to generate processed signals that are transmitted to the speakers 115. The processing performed by the sound identification application 212 may include, for example, and without limitation, filtering, pattern recognition, amplification, attenuation, and/or other types of auditory enhancements.

In various embodiments, the sound identification application 212 may be configured to block or permit certain sounds acquired by the microphone 110. For example, and without limitation, the sound identification application 212 could analyze signals received from the microphone 110 to determine whether one or more sounds acquired by the microphone 110 substantially match a set of sound parameters. The set of sound parameters could include, for example, and without limitation, one or more frequencies ranges, loudness values, signatures, and/or other characteristics that enable the sound identification application 212 to identify a particular sound acquired by the microphone 110.

In some embodiments, the set(s) of sound parameters are stored in the memory 210 associated with the listening device 100. The memory 210 may include one or more databases 214. In such embodiments, if one or more signals received from the microphone 110 substantially match a set of sound parameters stored in the database 214, then the sound identification application 212 may process the signal (s) to block, pass-through, or enhance the sounds with which the signals are associated. Further, in some embodiments, if one or more signals received from the microphone 110 match a set of sound parameters, then the sound identification application 212 may trigger an action via the computing device 200, such as pausing media playback or generating an alert for a user.

Sounds may be blocked, for example, and without limitation, via active noise cancellation, passive noise isolation, and/or merely by not reproducing the sounds for the user via the speaker 115. Sounds may be permitted by transmitting signals to the speaker 115 to cause the sounds to be produced by the speaker 115. Sounds may be produced by the speaker 115 with substantially the same auditory characteristics (e.g., loudness, pitch, tempo, frequency range, etc.) at which they were acquired by the microphone 110. That is, the sounds may be passed-through from the microphone 110 to the speaker 115 via the processor 202. In addition, the sound identification application 212 may permit sounds by enhancing the sounds, such as by modifying one or more auditory characteristics of the sounds, and producing the sounds for the user. For example, and without limitation, the sound identification application 212 could increase the loudness of a sound (e.g., relative to the loudness at which the sound was acquired by the microphone 110) and transmit a signal to the speaker 115 to cause the speaker 115 to produce the sound at the increased loudness value.

The sound identification application 212 may perform noise cancellation by analyzing the signals received from the microphone 110 and generating one or more cancellation signals. The cancellation signals are then transmitted to the speaker 115 and produced in order to cancel one or more sounds in the surrounding environment. For example, and without limitation, the sound identification application 212 could determine that a signal received from the microphone 110 substantially matches a set of sound parameters included in the blocked sounds database. In response, the sound identification application 212 may generate one or more cancellation signals (e.g., inverted phase signals) and transmit the cancellation signal(s) to the speaker 115. The speaker 115 may then produce the cancellation signal(s) in order to block one or more sounds in the surrounding environment.

I/O devices 204 may include input devices, output devices, and devices capable of both receiving input and providing output. For example, and without limitation, I/O devices 204 could include wired and/or wireless communication devices that send data to and/or receive data from the microphone(s) 110 and/or speaker(s) 115 included in the listening device 100.

Generally, computing device 200 is configured to coordinate the overall operation of the listening device 100. In other embodiments, the computing device 200 may be coupled to, but separate from other components of the listening device 100. In such embodiments, the listening device 100 may include a separate processor that receives audio samples acquired from the surrounding environment and transmits data (e.g., audio recordings) to the computing device 200, which may be included in a separate device, such as a personal computer, wearable device, smartphone, portable media player, etc. However, the embodiments disclosed herein contemplate any technically feasible system configured to implement the functionality of the listening device 100.

Crowdsourced Database for Sound Identification

As discussed above, various techniques have been developed for detecting sounds in an ambient environment and, in response to detecting a sound, performing a specific action. However, conventional systems typically are capable of detecting only generic types of sounds (e.g., generic traffic noise) and generally are ineffective at accurately detecting and isolating specific types of sounds (e.g., noise produced by a specific vehicle make and model). Further, although various techniques exist for "teaching" a system to recognize a specific type of sound, recording that specific type of sound in an ambient environment is difficult, since the sound is often masked by louder noises that are recorded by microphone(s).

In order to improve sound recognition algorithms, a sound could be recorded via a plurality of microphones. Then, using a source separation algorithm, ambient noise could be removed to extract the sound of interest. However, source separation algorithms typically require a sound to be recorded using a number of microphones that is greater than the number of sources of noise in the ambient environment. In particular, if the number of sources of noise in the ambient environment exceeds the number of microphones used to record the sound, then the results produced by the source separation algorithm may be indeterminate.

Unfortunately, in many real world applications, the number of sources of noise in the ambient environment greatly exceeds the number of microphones used to record a particular sound (e.g., due to space, processing, and/or cost constraints). In such cases, source separation algorithms must implement a model that is specific to the sources of noise present in the microphone recording(s). Because constructing such a model requires that all of the sources of noise be known in advance, such techniques are too complex to be implemented by the typical user of a consumer device, such as a mobile phone, headphones, a media player, etc. Consequently, due to these complexities and hardware requirements of conventional techniques, most users are unable to teach a system to effectively recognize specific types of sound with an ambient environment.

Accordingly, in various embodiments, in order to more effectively train a source separation algorithm, a large audio recording dataset of a particular sound type is crowdsourced from multiple users. The audio recordings in the dataset are then processed to build one or more models that can be used to isolate the sound type from noise included in each of the audio recordings. A set of sound parameters associated with the sound type is then determined and transmitted to user devices, enabling the user devices to accurately detect the sound type. Advantageously, increasing the number of audio recordings included in a dataset for a particular sound type enables the set of sound parameters associated with the sound type to be more precisely determined, leading to more accurate identification of the sound type within an ambient environment. Various techniques for crowdsourcing audio recordings of a sound type to generate large datasets and generating a set of sound parameters therefrom are described below in further detail in conjunction with FIGS. 3A, 3B, and 4.

Figure 3A:
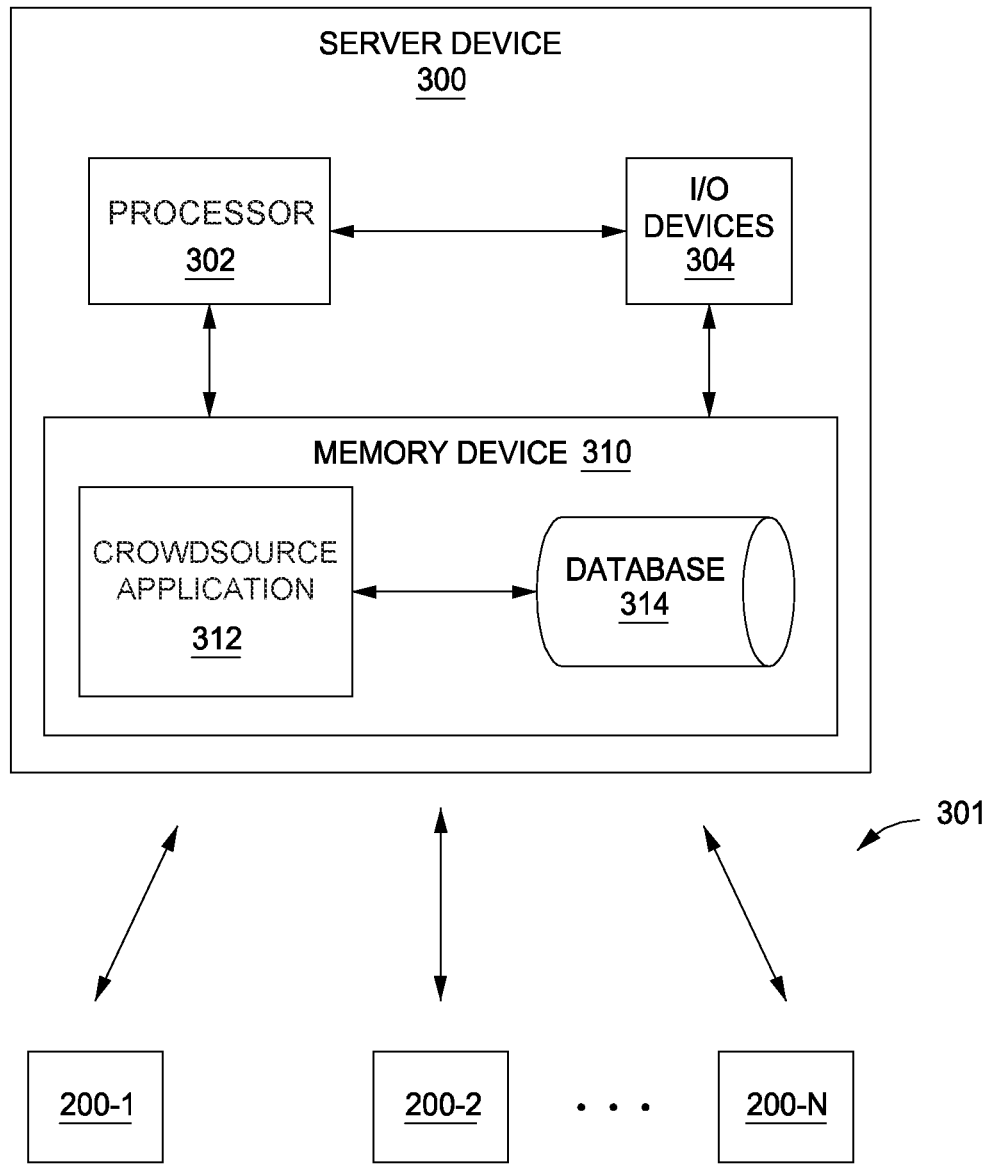
FIG. 3A illustrates a technique for crowdsourcing audio recordings from multiple computing devices via a network, according to various embodiments.

FIG. 3A illustrates a technique for crowdsourcing audio recordings from multiple computing devices 200 via a network 301, according to various embodiments. As shown, multiple computing devices 200, such as the computing device 200 illustrated in FIG. 2, acquire audio recordings of a particular sound type and transmit the audio recordings to the server device 300. The crowdsource application 312 then receives the audio recordings, stores the audio recordings in a database 314, and processes the audio recordings to determine a set of sound parameters associated with the sound type. The set of sound parameters associated with a particular sound type is then transmitted from the server device 300 to one or more remote devices (e.g., computing devices 200) to enable the sound identification application 212 in each remote device to identify the sound type.

The processor 302 may be any technically feasible form of processing device configured to process data and execute program code. Memory 310 may include a memory module or a collection of memory modules. The crowdsource application 312 within memory 310 is executed by the processor 302 to implement the overall functionality of the server device 300. In some embodiments, in order to satisfy the memory requirements associated with storing a large dataset of audio recordings, the memory 310 and/or database 314 may be implemented via a cloud storage service.

I/O devices 304 may include input devices, output devices, and devices capable of both receiving input and providing output. For example, and without limitation, I/O devices 304 may include wired and/or wireless communication devices that send data to and/or receive data from the computing devices 200 via the network 301.

In some embodiments, each computing device 200 transmits a descriptor in conjunction with each audio recording, where the descriptor indicates the sound type included in the audio recording. Then, upon receiving each audio recording, the crowdsource application 312 sorts the audio recordings based on the descriptors. For example, and without limitation, the crowdsource application 312 could group the audio recordings based on the descriptor received with each audio recording, as shown in FIG. 3B, which illustrates a first group of audio recordings 315-1 associated with a first descriptor (e.g., descriptor A) and a second group of audio recordings 315-2 associated with a second descriptor (e.g., descriptor B). The crowdsource application 312 could then separately process each group of audio recordings 315 to determine a set of sound parameters associated with each sound type. For example, and without limitation, the crowdsource application 312 could determine a set of sound parameters associated with the sound of a specific brand and model of a household appliance or the sound of a specific make and model of vehicle. The set of sound parameters associated with a particular sound type could then be transmitted to one or more computing devices 200, for example, and without limitation, in response to a request from a computing device 200 for a set of sound parameters associated with the sound type. Other examples of sound types that could be stored in the database 314 include, without limitation, the voice of a particular person, sounds produced by a specific animal, sounds produced by a specific type of appliance, and a specific type of horn or siren.

In some embodiments, each sound type may further be associated with a particular function or action of a vehicle, an appliance, a person, an animal, etc. For example, and without limitation, with reference to the first group of audio recordings 315-1 shown in FIG. 3B, the sound type could be a spin cycle function of a specific brand and model of washing machine. Alternatively, the sound type could be a rinse cycle function or a wash cycle function of the brand and model of washing machine. In another non-limiting example, with reference to the second group of audio recordings 315-2 shown in FIG. 3B, the sound type could be an acceleration function of a specific make and model of vehicle. Alternatively, the sound type could be an engine idle function or a horn function of the make and model of vehicle. In still other examples, the sound type could be sneezing action of a particular person or a barking action of a particular dog. Accordingly, each descriptor may provide a detailed description of the audio recording to the crowdsource application 312, enabling the crowdsource application 312 to precisely group audio recordings and, thus, more accurately determine a set of sound parameters associated with each sound type.

In various embodiments, the crowdsource application 312 processes audio recordings included in a particular group 315 by separating a sound type included in each of the recordings from noise included in the recordings. The crowdsource application 312 then determines a set of sound parameters (e.g., one or more frequencies ranges, loudness values, digital signatures, etc.) associated with the sound type based on the processed audio recordings. For example, and without limitation, the crowdsource application 312 could process the audio recordings by applying one or more source separation algorithms, such as an independent component analysis (ICA), to the audio recordings. Further, in order to apply the source separation algorithm(s) across a broad range of audio recordings and/or sound types, the crowdsource application 312 may process the audio recordings by training one or more supervised artificial intelligence (e.g., machine learning) models.

For example, and without limitation, the crowdsource application 312 could perform a time-frequency domain analysis on audio recordings to separate non-overlapping sound types in the time-domain or frequency-domain. Additionally, a statistical domain ICA analysis with a supervised machine learning approach could be applied to a non-Gaussian dataset that minimizes a multivariate function iteratively through a cost function (e.g., gradient decent). This particular approach would enable the crowdsource application 312 to train a source separation algorithm to extract the desired sound type and determine a set of sound parameters that could then be used for real-time identification of the sound type by the listening device 100. For example, and without limitation, the sound identification application 212 executing on the listening device 100 could implement the set of sound parameters associated with the sound type in conjunction with a source separation algorithm to identify occurrences of the sound type in the ambient environment.

In order to determine a set of sound parameters that accurately represents a particular sound type, the crowdsource application 312 may process twenty or more different audio recordings that include the sound type. In addition, for sound types that are less distinct relative to ambient noise in each of the recording, the crowdsource application 312 may receive and process more than one-hundred different crowdsourced audio recordings to determine a set of sound parameters that accurately represents the sound types. In general, however, the crowdsource application 312 may receive and process any number of audio recordings to determine a set of sound parameters associated with a particular sound type.

Once the crowdsource application 312 has determined a set of sound parameters associated with a particular sound type, the crowdsource application 312 stores the set of sound parameters in the database 314. Then, upon receiving a request from a computing device 200 for a set of sound parameters associated with the sound type, the crowdsource application 312 transmits the set of sound parameters to the computing device 200 via the network 301. Additionally, upon receiving additional audio recording from user(s) of one or more computing devices 200, the crowdsource application 312 may process the additional audio recordings to update the set of sound parameters.

In some embodiments, a user may download a set of sound parameters associated with a particular sound type from the server device 300 by inputting the sound type into a graphical user interface (GUI) associated with the computing device 200, such as a smartphone GUI, and transmitting a request to the crowdsource application 312. For example, a user of a computing device 200 could query the database 314 for a particular sound type, and, if the crowdsource application 312 has determined a set of sound parameters for the sound type, the set of sound parameters could be transmitted via the network 301 to the computing device 200 of the user. Additionally, if the sound type is not yet stored in the database 314 or the user would like to improve the accuracy of the set of sound parameters associated with the sound type, the user may generate an audio recording of the sound type via the microphone 110 and transmit the audio recording to the crowdsource application 312. Accordingly, a user may access a large database of sound types via the network 301, locally store (e.g., in database 214) sets of sound parameters associated with requested sound types, and contribute to generating sets of sound parameters associated with new sound types.

Figure 4:
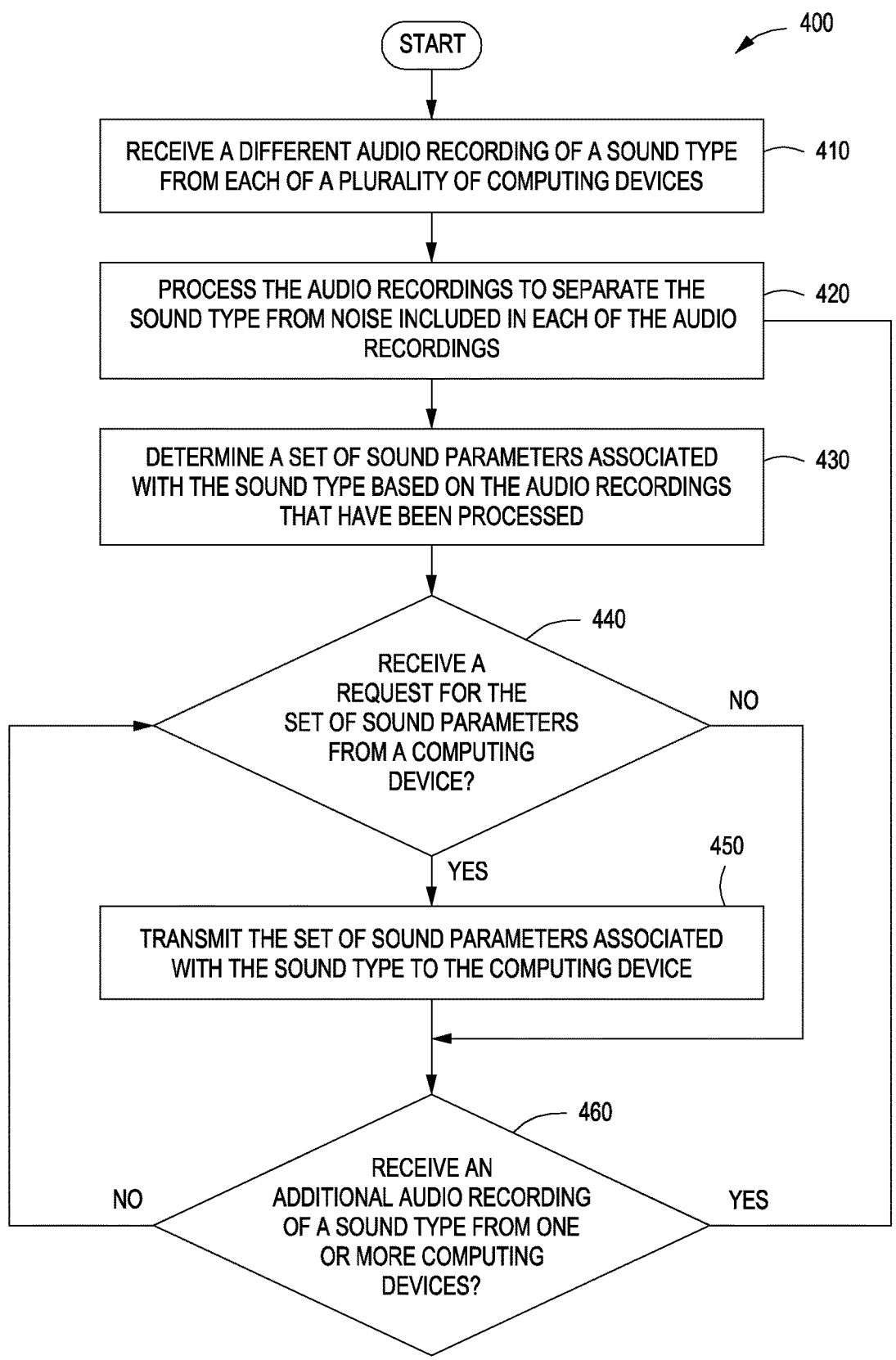
FIG. 4 is a flow diagram of method steps for determining a set of sound parameters associated with a sound type, according to various embodiments.

FIG. 4 is a flow diagram of method steps for determining a set of sound parameters associated with a sound type, according to various embodiments. Although the method steps are described in conjunction with the systems of FIGS. 1-3B, persons skilled in the art will understand that any system configured to perform the method steps, in any order, falls within the scope of the various embodiments.

As shown, a method 400 begins at step 410, where the crowdsource application 312 receives audio recordings associated with a particular sound type from a plurality of computing devices 200 via the network 301. As described above, users of different computing devices 200 may generate separate recordings of a particular type of sound and transmit the recording to the crowdsource application 312 at different times. At step 420, once a sufficient number of audio recordings have been received and stored in the database 314, the crowdsource application 312 processes the audio recordings to separate the sound type from noise included in each of the audio recordings. Then, at step 430, the crowdsource application 312 determines a set of sound parameters associated with the audio recordings that have been processed.

Next, at step 440, the crowdsource application 312 determines whether a request for the set of sound parameters associated with the sound type has been received from a computing device 200. If a request has been received, then the method 400 proceeds to step 450, where the crowdsource application 312 transmits the set of sound parameters to the computing device 200. Upon receiving the set of sound parameters, a sound identification application 212 included in the computing device 200 may implement the set of sound parameters to identify the sound type in ambient noise and optionally perform one or more actions based on identifying the sound type. If, on the other hand, a request for the set of sound parameters has not been received by the crowdsource application 312, then the method 400 proceeds to step 460.

At step 460, the crowdsource application 312 determines whether one or more additional audio recordings of the sound type have been received from one or more computing devices 200. If one or more additional audio recordings have been received, then the method 400 returns to step 420, where the crowdsource application 312 processes the additional audio recordings to separate the sound type from noise included in the additional audio recordings. At step 430, the crowdsource application 312 may then determine an updated set of sound parameters based on the additional audio recordings. If no additional audio recordings have been received, then the method 400 returns to step 440, where the crowdsource application 312 determines whether a request for the set of sound parameters has been received from a computing device 200.

Although the method 400 of FIG. 4 is described in conjunction with a single sound type, the techniques described herein may be implemented in a parallel or serial fashion with any number of sound types. Further, although the techniques have been described in conjunction with a single crowdsource application 312, any number of crowdsource applications 312 executing on any number of server devices 300 may be used to implement the techniques.

In sum, audio recordings of a particular sound type are acquired by multiple remote computing devices and transmitted to a server device. A crowdsource application executing on the server device then processes the audio recordings to determine a set of sound parameters associated with the sound type. Next, the crowdsource application transmits the set of sound parameters in response to a request from a remote computing device, enabling the remote computing device to identify the sound type in an ambient environment.

One advantage of the techniques described herein is that audio recordings of a specific sound type can be crowdsourced to generate large datasets, enabling a set of sound parameters to be more accurately determined for that specific sound type. Accordingly, the user of a computing device is able to retrieve sets of sound parameters to identify specific types of sounds that are not preprogrammed into the computing device and which otherwise could not be generated without incurring significant hardware and processing costs.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable storage medium including instructions that, when executed by a processor, configure the processor to determine a set of sound parameters associated with a sound type, by performing the steps of:

receiving, via a network, a different audio recording of a first sound type from each remote computing device included in a first plurality of remote computing devices, wherein each of the audio recordings corresponds to a different occurrence of the first sound type that is recorded at a different time;

processing the audio recordings via a processor to determine a first set of sound parameters associated with the first sound type; and transmitting the first set of sound parameters associated with the first sound type to at least one remote computing device.

2. The non-transitory computer-readable storage medium of claim 1, wherein the instructions further configure the processor to receive a request for the first set of sound parameters from the at least one remote computing device, wherein the first set of sound parameters configures the at least one remote computing device to identify the first sound type within ambient sound.

3. The non-transitory computer-readable storage medium of claim 1, wherein processing the audio recordings comprises applying a machine learning algorithm to the audio recordings of the first sound type to separate the first sound type from noise included in each of the audio recordings.

4. The non-transitory computer-readable storage medium of claim 3, wherein the machine learning algorithm comprises independent component analysis (ICA).

5. The non-transitory computer-readable storage medium of claim 1, wherein processing the audio recordings of the first sound type comprises minimizing a cost function to train a source separation algorithm.

6. The non-transitory computer-readable storage medium of claim 1, wherein the instructions further configure the processor to:

receive, via the network, a different audio recording of a second sound type from each remote computing device included in a second plurality of remote computing devices;

process the audio recordings of the second sound type via the processor to determine a second set of sound parameters associated with the second sound type; and transmit the second set of sound parameters associated with the second sound type to at least one remote computing device.

7. The non-transitory computer-readable storage medium of claim 6, wherein the instructions further configure the processor to:

receive, from each remote computing device included in the first plurality of remote computing devices, a first descriptor associated with the first sound type;

receive, from each remote computing device included in the second plurality of remote computing devices, a second descriptor associated with the second sound type;

sort, based on the first descriptors and the second descriptors, the audio recordings received from the first plurality of remote computing devices and the second plurality of remote computing devices into a first group of audio recordings associated with the first sound type and a second group of audio recordings associated with the second sound type;

associate the first set of sound parameters with the first descriptor; and associate the second set of sound parameters with the second descriptor.

8. The non-transitory computer-readable storage medium of claim 7, wherein each of the first descriptor and the second descriptor comprises at least one of a product brand and a product model.

9. The non-transitory computer-readable storage medium of claim 1, wherein the remote computing devices included in the first plurality of remote computing devices comprise at least one of a mobile computer, a wireless headphone, and a media player.

10. A method for determining a set of sound parameters associated with a sound type, the method comprising:

receiving, via a network and from each remote computing device included in a first plurality of remote computing devices, an audio recording of a first sound type and a descriptor associated with the first sound type, wherein each of the audio recordings corresponds to a different occurrence of the first sound type that is recorded at a different time;

processing the audio recordings via a processor to determine a first set of sound parameters associated with the first sound type;

receiving a request associated with the descriptor from at least one remote computing device; and in response, transmitting the first set of sound parameters associated with the first sound type to the at least one remote computing device.

11. The method of claim 10, wherein the first set of sound parameters configures the at least one remote computing device to identify the first sound type within ambient sound.

12. The method of claim 10, further comprising:

receiving, via the network and from each remote computing device included in a second plurality of remote computing devices, an additional audio recording of a first sound type and the descriptor associated with the first sound type; and processing the additional audio recordings via the processor to determine an updated set of sound parameters associated with the first sound type.

13. The method of claim 12, further comprising transmitting the updated set of sound parameters associated with the first sound type to the at least one remote computing device.

14. The method of claim 10, wherein processing the audio recordings comprises training a source separation algorithm to separate the first sound type from noise included in each of the audio recordings.

15. The method of claim 10, wherein the first plurality of remote computing devices comprise at least one of a mobile computer, a pair of headphones, and a media player.

16. The method of claim 10, wherein the first descriptor comprises at least one of a vehicle model, an appliance model, a name of a person, and an animal.

17. The method of claim 10, further comprising, after receiving the audio recordings of the first sound type, storing the audio recordings in a cloud storage device, wherein the first set of sound parameters are transmitted from the cloud storage device to the remote computing device in response to receiving the request associated with the descriptor.

18. The method of claim 10, wherein receiving the audio recordings of the first sound type comprises receiving at least one-hundred different audio recordings.

19. A system for determining a set of sound parameters associated with a sound type, the system comprising:

a memory storing a crowdsource application; and a processor that is coupled to the memory and, when executing the crowdsource application, is configured to:
- receive, via a network, a different audio recording of a first sound type from each remote computing device included in a first plurality of remote computing devices, wherein each of the audio recordings corresponds to a different occurrence of the first sound type that is recorded at a different time;
- process the audio recordings to separate the first sound type from noise included in each of the audio recordings;
- determine a first set of sound parameters associated with the first sound type based on the audio recordings that have been processed; and
- transmit the first set of sound parameters associated with the first sound type to at least one remote computing device.

20. The system of claim 19, wherein the crowdsource application further configures the processor to store the audio recordings of the first sound type and the first set of sound parameters in a cloud storage device, and wherein the first set of sound parameters are transmitted from the cloud storage device to the at least one remote computing device.

* * * * *